United States Patent [19]

Ogletree

[11] Patent Number: 4,780,213

[45] Date of Patent: Oct. 25, 1988

[54] FILTER MEDIA AND METHOD OF FILTRATION

[75] Inventor: Bruce J. Ogletree, Iselin, N.J.

[73] Assignee: Idreco USA Ltd., Bristol, Pa.

[21] Appl. No.: 939,861

[22] Filed: Dec. 9, 1986

[51] Int. Cl.$^4$ .............................................. B01D 37/02
[52] U.S. Cl. .................................... 210/679; 210/686; 210/777; 210/193; 210/483
[58] Field of Search ............... 210/679, 686, 777, 778, 210/193, 483, 496, 502.1, 503, 504, 506, 510.1, 323.2

[56] References Cited

U.S. PATENT DOCUMENTS

| 3,250,703 | 5/1966 | Levendusky | 210/686 |
| 3,250,704 | 5/1966 | Levendusky | 210/686 |
| 3,252,270 | 5/1966 | Pall et al. | 210/505 |
| 4,045,338 | 8/1977 | Miyamoto et al. | 210/679 |
| 4,293,414 | 10/1981 | Gianneli | 210/193 |

Primary Examiner—Ivars Cintins
Attorney, Agent, or Firm—Paul & Paul

[57] ABSTRACT

Filter media having a foraminous sintered metal support structure which exhibits a particle retention pore size in the range of from about 0.5 microns to less than about 5.0 microns and a bubble point test pressure of from 20 to 50 inches of water. A continuous precoat layer of discrete anion and cation exchange resin particles having a minimum diameter of about 10 microns and the following particle size distribution:

| % | |
|---|---|
| Less than 2 | Particles greater than 200 microns |
| Less than 2 | Particles less than 10 microns | is formed upon the sintered metal structure. Liquid is purified by first flowing it through the precoat layer, and then through the pores of the foraminous sintered metal structure.

3 Claims, No Drawings

FILTER MEDIA AND METHOD OF FILTRATION

BACKGROUND OF THE INVENTION

This invention relates to filter media for purifying and filtering of liquids, for example in steam cycles of nuclear and fossil power plants and radioactive water decontamination. The filter media of the invention is particularly useful in condensate polishing, reactor water cleanup, fuel pool cleanup and radwaste decontamination in power plants. The filter media of the invention is also useful in such fields as semi-conductor manufacturing, pharmaceutical synthesis, carcinogen removal from potable water, and generally to industrial processes which involve purification of a fluid.

Liquid purification processes are often accomplished by providing a filter vessel with a septum in it through which fluid being filtered must pass in flowing from an inlet to an outlet. Known septa often take the form of one or more porous tubes disposed inside the filter vessel. Fluid to be filtered is introduced into the filter vessel on the outside of the tubes, flows radially into the interior of the tubes, and then the filtered fluid flows axially through the tubes to the outlet of the filter vessel. Prior to conducting filtration, such septa are often coated with a layer of particulate precoat material, such as an ion exchange resin or other type of material which will perform a mass transfer operation. The precoat layer is formed by introducing particles of precoat material into the fluid flow on the inlet side of the filter apparatus. The fluid flow carries them to the perforate septum, where they build up a layer of particulate material on the inlet side of the septum which is maintained there by the fluid flow. Once the precoat layer is formed, the fluid to be purified is introduced into the flow stream and flows through the precoat layer and the septum. The precoat layer aids the perforate septum in removal of particulate matter from the fluid to be treated, and may remove dissolved substances from this fluid.

Known septa are typically formed from a rigid tube, such as of metal, having a number of holes drilled in the tube wall. The tube is provided solely for mechanical support of a filter layer provided on its exterior. Such filter layers are typically formed of a flexible wire mesh which is helically wrapped around the tube and affixed to it by means such as a spiral weld, or by a layer of fibrous material which is wound around the tube. These known septum structures suffer from a number of problems.

Septa formed from wire mesh wrapped around a perforate tube have a greatly reduced effective surface area caused by the spiral weld pattern used to attach the overlapped edges of the helically wound mesh strip to each other and to the tube. Flow is blocked where the welds occur, and only 75-80% of the tube surface area may be available for filtration. Also, the openings of the finest mesh available and suitable for use in a septum (400 mesh) have openings of about 32 microns. Because the size of particles of precoat material typically used in condensate polishing applications includes a substantial number of particles smaller than 32 microns, these septa are subject to "bleedthrough", where particles of precoat material pass through the mesh and precoat layers into the output flow. Such bleed-through can pose a substantial problem when the water containing the precoat material is reintroduced to a boiler or the like. Further, the use of precoat material with particles smaller than the mesh openings leads to the precoat material being supported on the mesh in some openings by a plurality of particles which have bridged them. These bridges are unstable, subject to collapse and bleed-through of precoat material, especially when the flow rate is increased from 1 gpm/sq.ft. typical during operation of the filter apparatus, and also as differential pressure increases during operation. Further, the nature of the precoat layer formed on the prior art mesh septa may lead to ineffective filtering, premature plugging, and difficulty of cleaning. In a power plant, water to be treated often contains iron oxide, $Fe_2O_3$, which may be present in sizes from very small particles to colloidal gelatinous masses. Because the precoat layer is deposited and maintained by the fluid flow, and there is no fluid flow through the welded areas, the mesh septum when coated has a helical "valley" over the spiral weld line, where the coating thickness is zero over the welds and increases on either side of them, reaching a peak midway between weld binds. When a freshly coated mesh septum is first exposed to fluid to be filtered, the fluid flow is concentrated in those areas immediately adjacent the weld, where the precoat thickness is less and thus the resistance to flow is the least. In these regions, the filtering effectiveness is at a minimum because of the thinness of the precoat layer, and substantial amounts of the material to be filtered will pass through the septum to the outlet stream. In this process, the wire mesh adjacent the welds is exposed to the gelatinous iron oxide, which may adhere to the mesh and quickly plug it. Also, the filtering capacity of the thin precoat layer adjacent the welds is small, and it rapidly becomes exhausted and plugged. This further reduces the area for filtering, and causes an increase in differential pressure of the septum, eventually requiring it to be taken out of service for cleaning. The aforementioned adhesion of the iron oxide to the mesh renders such cleaning incapable of being performed by backwashing (reversal of fluid flow direction to dislodge the precoat layer), requiring laborious and time-consuming procedures such as acid cleaning or steam lancing to remove the iron oxide.

Fiber wound septa in practice are also subject to non-uniformity of coating over their surface, with consequent variation in fluid flow and filtering effectiveness over the surface. Moreover, should any iron oxide penetrate the fiber layer, it is substantially more difficult to clean than even wire mesh septa. It may not be completely cleaned by backwashing, and cannot be cleaned by steam lancing, and acid cleaning is only somewhat effective in removing materials from the fibers. The fibers are subject to shrinkage with time and exposure to hot water in the filtering process. Fiber wound septa require replacement at more frequency intervals than metallic septa.

Both of the above described septum structures are fragile and subject to damage in fabrication and handling, and in use due to high differential pressures such as may occur with high flow rates of fluid or surges.

U.S. Pat. No. 4,045,338 discloses a filter media comprising the combination of a precoat of carbonaceous fibers upon a porous stainless steel sintered metal support. The fibers have a length in the range of from 0.1 to 5 mm and a diameter in the range of from 1 to 50 microns and acidic groups in a concentration of at least 0.01 meq/g on their surface. The pore diameter of the sintered metal support is described as being sufficiently small so that there is no danger of allowing fibers to pass through the pores, however a size range of 5 to 200 microns pore diameter is disclosed. It is obvious that such media is imperfect in that the 1 micron diameter fibers can enter the pores of the sintered metal support.

U.S. Pat. No. 3,250,702 discloses a filter media comprising the combination of a precoat of divinyl-benzene-styrene copolymer type anion-cation resin particles having a size range of 100 to 400 mesh upon a cotton-wound annular filer screen having an effective porosity of 2 microns. By including a fiber wound septa, this filter media is subject to the above-described deficiencies of such media.

U.S. Pat. No. 3,250,703 discloses a filter media comprising the combination of a precoat of divinyl-benzene-styrene copolymer type anion-cation resin particles having a size range of 100 to 400 mesh upon a leaf filter of 24×110 Dutch weave wire cloth. The effective pore size of such wire cloth is approximately 100 microns. Therefore, this media is unsatisfactory for use in condensate polishing applications which include impurity particles smaller than 32 microns.

SUMMARY OF THE INVENTION

It is therefore an object of the invention to provide filter media which allows negligible bleed-through of particulate precoat material.

It is also an object to provide filter media which may be completely cleaned by backwashing and indefinitely reused.

It is a further object to provide filter media in which a layer of particulate precoat material is uniformly distributed over the surface of the septum.

It is a further object to provide a septum for use in filter media which is easily manufactured.

It is yet another object to provide filter media which is usable with a wide range of fluid flow rates.

Yet another object is to provide a septum for filter media which is not susceptible to premature plugging.

Finally, it is an object to provide a septum for use in filter media which is extremely rugged, and able to withstand handling and installation without special care, and able to withstand high fluid flow rates and high differential pressures.

These and other objects are accomplished by providing a septum consisting of a porous rigid homogeneous material in which the pore size is substantially smaller than the size of the smallest of the particles of a specific ionexchange resin precoat material. A particularly desirable material is porous metal. Porous metal is formed by the sintering of powdered metal, where the points of contact of the powdered metal are fused together, leaving a perforated structure having a large number of tortuous paths through it between the sintered particles. This material has heretofore been used in a large number of filtering applications, such as the removal of catalysts from a process fluid. This material has also been used in some of the power plant applications described above. The results of such use were disasterous, since the porous metal septum was used as a filter and quickly became completely plugged, and could not be cleaned by backwashing because of penetration of particles into the porous metal.

It has been discovered that the use of a particular rigid porous metal septum in combination with a selected particulate precoat layer satisfies the foregoing objects of the invention while avoiding the above-noted drawbacks of known septum and precoat combinations, as well as those of a filter consisting solely of rigid porous metal material.

The above and other objects, features and advantages of the present invention will become more clear from the following description of the preferred embodiment of the invention.

DETAILED DESCRIPTION

I have now found that a particular porous metal septa when combined with a specific size range of discrete ion-exchange resin particles as a precoat results in significant improvements in ion-exchange resin purification technology. The resultant filter media of this invention comprises a support consisting essentially of a foraminous sintered metal structure having a particle retention pore size in the range of from about 0.5 microns to less than about 5.0 microns and exhibiting a bubble point test pressure of from 20 to 50 inches of water, such support having in combination therewith a continuous precoat layer formed upon said sintered metal structure consisting essentially of discrete anion and cation ion-exchange resin particles, said particles having a minimum diameter of about 10 microns and the following particles size distribution:

| % | |
|---|---|
| Less than 2 | Particles greater than 200 microns |
| Less than 2 | Particles less than 10 microns |

The foraminous sintered metal structure is conveniently provided in the form of a tubular element having dimensions comparable to prior known filter elements such as wound fiber tubes and wire mesh tubes. For use in a purifying filter vessel a plurality of identical sintered metal tubular elements are assembled into a tube bundle in a conventional manner as with the prior known wire mesh tubes and then inserted into a filter vessel as a unit. The filter tubes in the filter vessel are positioned by being clamped at their top ends to a tube sheet with each tube sealed individually to the tube sheet with an O-ring and supported at the bottom with a grid arrayed to provide lateral support and act as a flow straightening device. The tube bundle is inserted into the filter vessel as a unit, and flow is into the inlet at the lower portion of the filter vessel upward into the bundle, into the filter tubes through the tube sheet and out the upper effluent connection to the vessel.

EXAMPLE

An in-plant trial was conducted comparing the porous metal element performance with conventional screen type element performance in an operating ion-exchange resin precoat water purification system in power plant service. The conventional element was a 35-micron nominal stainless steel woven mesh spiral wound and supported on a perforated stainless steel backup tube. The porous metal element was a porous 316L stainless sintered metal tube having a particle retention pore size of 2.0 microns. Both elements were pre-coated conventionally with the same depth of discrete anion and cation ion-exchange resin particles, such particles having a minimum diameter of about 10 microns and the following particle size distribution:

| % | |
|---|---|
| Less than 2 | Particles greater than 200 microns |

| % | |
|---|---|
| Less than 2 | Particles less than 10 microns |

Matched runs over a period of days were conducted with regular observations being made of effluent conductivity and $SiO_2$ removal. The porous metal element consistently outperformed the woven mesh element. By the use of Millipore® filters, resin particles bleed through was compared at 0–5 minutes, 0–90 minutes and at steady state conditions. While the porous metal element produced no detectable bleed through, the woven mesh element produced bleed through of 158.3 ppb at the end of five minutes, 8.10 ppb at the end of ninety minutes, and 0.27 ppb at steady state.

Tests with the porous metal and ion-exchange resin combination shown that iron/metal oxide filtration is almost theoretical, as is the removal of ionized solid, e.g., sodium, chlorides, sufates and silica.

There has thus been provided an improved filter septum and ion-exchange resin combination filter media that produces numerous advantages to water purification processes. The nature of the porous metal surface characteristics enables more uniform precoat deposition than with prior filtration materials and configurations; namely, wire mesh per se, wire mesh spiral wound and welded, and fiber wound. The provision of negligible bleed through as a result of the use of the filter media of this invention is a principal advantage both as to effluent quality and in preventing fouling or plugging of the porous metal septum.

Having thus described my invention, I claim:

1. Filter media comprising a support consisting essentially of a foraminous sintered metal structure having a particle retention pore size in the range of from about 0.5 microns to less than about 5.0 microns and exhibiting a bubble point test pressure of from 20 to 50 inches of water, a continuous pecoat layer formed upon said sintered metal structure consisting essentially of discrete anion and cation ion-exchange resin particles, said particles having a minimum diameter of about 10 microns and the following particle size distribution:

| % | |
|---|---|
| Less than 2 | Particles greater than 200 microns |
| Less than 2 | Particles less than 10 microns. |

2. The filter media of claim 1 wherein the sintered metal structure consists of stainless steel.

3. The method of purifying liquid with de-ionizing resins which comprises (1) establishing a substantially continuous precoat layer consisting essentially of discrete ion-exchange resin particles, said particles having a minimum diameter of about 10 microns and the following particle size distribution:

| % | |
|---|---|
| Less than 2 | Particles greater than 200 microns |
| Less than 2 | Particles less than 10 microns | upon a support consisting essentially of a foraminous sintered metal structure having a particle retention pore size in the range of from about 0.5 microns to about 5.0 microns and exhibiting a bubble point test pressure of from 20 to 50 inches of water, and then causing liquid to be purified to first flow through said precoat layer, and then to flow through the pores of said foraminous sintered metal structure, and recovering a purified liquid effluent.

* * * * *

UNITED STATES PATENT OFFICE
CERTIFICATE OF CORRECTION

Patent No. 4,780,213    Dated Oct. 25, 1988

Inventor(s) Bruce J. Ogletree

It is certified that error appears in the above-identified patent and that said Letters Patent are hereby corrected as shown below:

Column 5, line 18, "shown" should be "show".

Column 5, line 19, "solid" should be "solids".

Signed and Sealed this

Fourteenth Day of March, 1989

Attest:

DONALD J. QUIGG

*Attesting Officer*    *Commissioner of Patents and Trademarks*